G. WILKINSON.
THERMAL SWITCH.
APPLICATION FILED NOV. 24, 1915.

1,275,814.

Patented Aug. 13, 1918.
2 SHEETS—SHEET 1.

Inventor
George Wilkinson
atty Chas. H. Keel

G. WILKINSON.
THERMAL SWITCH.
APPLICATION FILED NOV. 24, 1915

1,275,814.

Patented Aug. 13, 1918.
2 SHEETS—SHEET 2.

UNITED STATES PATENT OFFICE.

GEORGE WILKINSON, OF HARROGATE, ENGLAND.

THERMAL SWITCH.

1,275,814.  Specification of Letters Patent. Patented Aug. 13, 1918.

Application filed November 24, 1915. Serial No. 63,278.

*To all whom it may concern:*

Be it known that I, GEORGE WILKINSON, a subject of Great Britain, residing at Beech Mount, 23 Otley road, Harrogate, in the county of Yorkshire, England, have invented certain new and useful Improvements in Thermal Switches, of which the following is a specification.

My improvements relate to electric thermal switches for use as thermostats in which the expansion and contraction of mercury or other fluid, due to heat and cold, is employed to "make" and "break" electric circuits.

It is recognized that in order to get reliable results means must be taken to prevent oxidization at the point where the "make" and "break" of the electric circuit takes place. This condition has been achieved by inclosing the "make" and "break" contacts in a sealed glass chamber containing a vacuum or filled with inert gas.

Such a device is not adjustable and is capable of carrying a feeble current only at low pressure such, for instance, as is furnished by a voltaic battery.

These feeble currents are incapable of performing much work thus often involving the use of relays or other multiplying gear and the use of a battery or its equivalent is objectionable and often unreliable.

My object is to provide a thermostat capable of dealing in a reliable manner with heavier currents and fit for use with the electrical pressures employed by public supply authorities, thus rendering the use of relays or other multiplying gear unnecessary under ordinary conditions of work.

In carrying out my improvements I employ a reservoir of suitable shape containing mercury or its equivalent. The expansion or contraction of the mercury due to heat variation serves to raise or lower its height in a tube or aperture of small bore. The column of mercury in the tube or aperture forms one pole of the electric circuit and the other pole may be a body of mercury, a platinum conductor or some other equivalent.

In order to prevent oxidization at the point of contact I envelop the two poles in an inert gas such as hydrogen. The gas is retained by an outer chamber of glass or other material, the bottom edge of the chamber being sealed in a bath of mercury or other suitable fluid.

In practice I prefer for convenience to have the platinum or other pole in a fixed position and to make the apparatus adjustable by varying the height of the moving column. This can readily be done by a screw motion, plunger, or any other equivalent device which renders the capacity of the mercury chamber adjustable and therefore regulates the height of the mercury column for any given temperature.

Such being the nature of my invention I have hereto annexed drawings setting forth a practical embodiment thereof.

Figure 1:
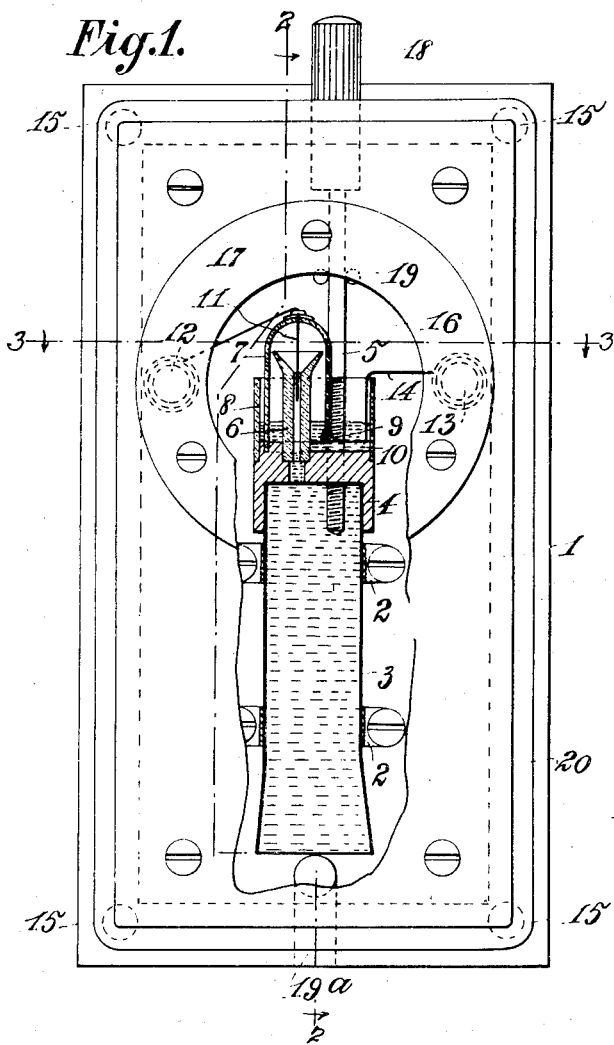
Figure 1 is a front elevation of the apparatus, partly in section.

The reference numeral 1 represents a base board, usually mounted upon a wall or partition. Fixed upon the base by means of metal clips 2 is the tube 3 of steel or other suitable metal which being closed at the bottom end and surmounted at the upper end by the tight fitting cover 4 forms a closed chamber which is filled with mercury through the hole normally occupied by the adjusting screw 5. Upon the cover 4 is mounted the fine bore glass tube 6, the superimposed glass dome 7, and the enveloping glass ring 8, all being fixed in position by suitable cement as is also the cover 4 upon the steel tube 3. The steel tube is completely filled with mercury until it rises up in the capillary tube 6 and in the enveloping glass ring 8, thus sealing the bottom edge of the glass dome 7 and rendering it gas-tight.

The adjusting screw 5 is now inserted and screwed down thus causing the mercury to rise up the capillary tube and flood the taper enlargement at its upper end.

The glass dome 7 is now charged with inert gas by inserting a small rubber or other pipe passed under the mercury seal and through the slot 9 formed in the bottom edge of the dome 7 and the slot 10 in the metal cover 4. The incoming gas rises in the dome 6 and expels the air which bubbles through the mercury seal and thus escapes. I do not describe at length the method of producing the inert gas or the exact nature of same as numbers of such gases and methods are already well known.

The dome 7 is fitted with platinum or other suitable contact wire 11 hermetically sealed into the glass dome above the capillary tube 6 into which it passes for a short distance, thus forming one pole of the apparatus; the other pole is formed by the metal tube and the mercury charge. 12 and 13 are the terminals one being connected to the platinum wire sealed in the glass dome and the other to the metal work or to the mercury charge. A convenient method of connection is as shown, viz., by a wire 14 taken from the terminal 13 over the edge of the glass cylinder and dipping into the mercury seal.

The electrical connections are shown in Fig. 1 only.

The required adjustment for making contact at any predetermined temperature within the range of the instrument is obtained by screwing in or out of the adjusting screw 5 which is furnished with an insulated extension 18 protruding through the cover of the instrument and steadied by the guide pins 19.

20 is a cover preferably of polished wood screwed upon the base block 1 but held off therefrom by screws or other fittings 15 thus forming a narrow slot for the free circulation of air. The cover is preferably fitted with a glass inspection window 16 retained by the rim 17. 19ª is the slot and hole for the accommodation of the connecting wires.

Figure 2:
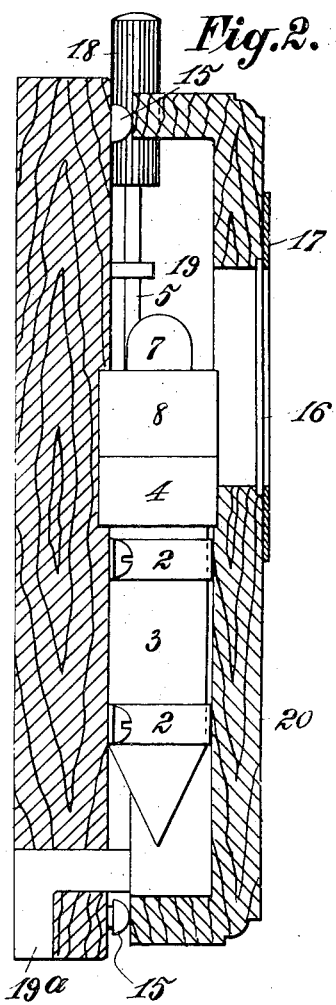
Fig. 2 is an end elevation, taken on line 2—2 of Fig. 1 partly in section.
Figure 3:
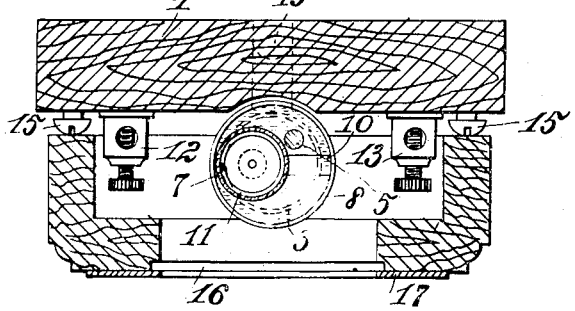
Fig. 3 is a plan view, partly in section, taken on line 3—3 of Fig. 1.
Figures 4, 5:
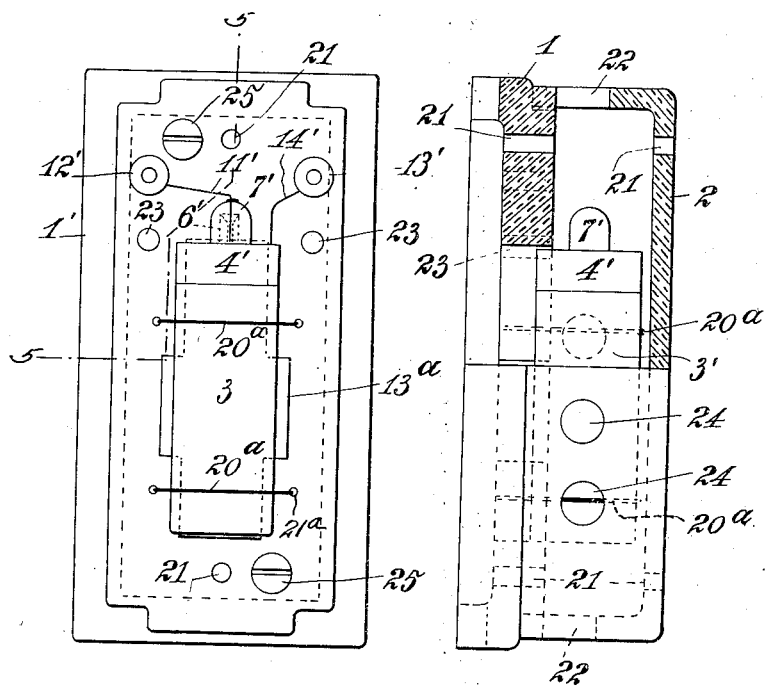
Fig. 4 is an elevation with cover removed of a modification of the apparatus.
Fig. 5 is a side elevation partly in section of the same, taken on line 5—5 of Fig. 4 the electrical connections being omitted.

Figs. 4 and 5 show a more compact design of the thermostat mounted upon a small porcelain base with a porcelain cover. The distinguishing characteristic of this design is that the glass dome is much smaller than in Figs. 1, 2, and 3, and the inert gas contained therein is produced from the atmosphere impounded under the dome.

The inert gas is obtained by setting the thermostat in operation and allowing the mercury in the capillary tube to combine with the small amount of oxygen contained in the air, forming oxid of mercury. This oxid is then washed out of the capillary tube by screwing the adjusting screw farther into the chamber until the mercury overflows the capillary tube and carries with it the oxid into the mercury seal below. The thermostat is then reset to its proper working temperature and a clean surface of mercury is presented to the platinum contact. This washing out can be repeated more than once if necessary but in normal cases one wash out is generally found sufficient.

The various parts of this modification of the apparatus are as follows:—

1' is an earthenware base surmounted by earthenware cover 2; 3' is the steel tube with flat bottom and fitted with an ebonite plug 4', the upper part of which is formed to engage the lower edge of the small glass dome 7'. Dome 7' covers the fine bore glass tube 6 and is furnished with a free passage under its bottom edge below the level of the mercury seal. The dome 7' is fitted with platinum or other suitable contact wire 11' sealed into the glass dome above the capillary tube 6' into which it passes for a short distance, the other end of the wire is connected to terminal 12', thus forming one pole of the apparatus. The other pole is formed by wire 14' connecting the mercury within the faucet with terminal 13'. The steel tube 3' rests on the edges of the cruciform slot 13ª in the base 1' and is secured in position by the binding wires 20ª passing through the small holes 21ª.

The small holes in base and cover 21 are to receive metal posts and nuts for securing the cover in porcelain. 22 are ventilating slots in the top and bottom of the cover, the adjusting screw (not shown in Figs. 4 and 5) also passes through the top slot. 23 are holes for the insulated connecting conductors and 24 are holes for ventilation in the sides of the earthenware cover. 25 are fixing screws. The methods of charging with mercury and adjusting are exactly the same as described in connection with Figs. 1, 2 and 3.

I have described the principle of operation of my invention together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. A thermal switch comprising the combination of a reservoir containing a conducting liquid, a capillary tube therefor, a liquid sealed terminal carrying hood containing an inert gas, and means provided in the hood for allowing the renewal of said gas inclosing the terminal and liquid meniscus in said inert atmosphere.

2. A thermal switch comprising the combination of a reservoir containing a conducting liquid, a capillary tube connected to said reservoir, a sealed dome containing inert gas mounted on said reservoir and inclosing the capillary tube and a terminal projecting through said dome into the capillary tube.

3. A thermal switch comprising the combination of a reservoir containing an expansive conducting liquid, a capillary tube connected to said reservoir, a sealed dome containing inert gas mounted on said reservoir and inclosing the capillary tube, a terminal projecting through said dome into the capillary tube and means for adjusting the capacity of said reservoir.

4. A thermal switch comprising the combination of a metallic reservoir containing mercury, a capillary tube connected to said reservoir, a glass dome containing inert gas mounted on said reservoir and inclosing said capillary tube, a current conductor sealed in said dome and terminating in said capillary tube and electrical connections to said metallic reservoir and current conductor respectively.

5. A thermal switch comprising the combination of a reservoir, a cap covering the top of said reservoir and provided with an opening, a capillary tube mounted on said cap connecting with the reservoir through said opening, a sealed chamber containing inert gas inclosing said capillary tube, a current conductor passing through said chamber and terminating in said capillary tube and an adjusting screw in said cap for changing the capacity of said reservoir.

6. A thermal switch comprising the combination of a stationary electric terminal, a current conducting liquid expansible by heat and adapted to contact with said terminal at a predetermined temperature, a hood and liquid sealing means for preventing oxidation of said terminal or liquid.

7. A thermal switch comprising a stationary electric terminal, a reservoir containing a current conducting liquid, a capillary tube in which the liquid rises with temperature increase and a removable liquid sealed terminal carrying hood containing inert gas inclosing said terminal and capillary tube.

8. A thermal switch comprising the combination of a base provided with supports, a reservoir filled with mercury mounted on said supports, a capillary tube connected to the reservoir, a transparent hood filled with inert gas mounted over the capillary tube and sealed with mercury, an electric terminal sealed in the hood and terminating in the capillary tube, an adjusting screw entering the reservoir for changing its capacity and a cover mounted on the base having a window opposite the hood.

9. A thermal switch comprising the combination of a reservoir containing mercury, a capillary tube connected to the top of the reservoir, a glass dome containing inert gas mounted over the capillary tube and sealed with mercury, an electric terminal located in said capillary tube and adapted to coöperate with the mercury in the reservoir at a predetermined temperature and means for adjusting the capacity of said reservoir.

10. A thermal switch comprising the combination of a reservoir containing mercury, a capillary tube connected to the top of said reservoir, an electric terminal in said capillary tube and adapted to be engaged by the mercury at a predetermined temperature, a sealed hood inclosing said capillary tube, and a normally sealed opening in said hood through which it is charged with an inert gas.

11. A thermal switch comprising the combination of a steel tube filled with mercury, a capillary tube connected to said steel tube having a tapered enlargement at its upper end, a glass hood containing inert gas mounted on the steel tube and inclosing the capillary tube, a mercury seal for said glass hood, an electric terminal sealed in the hood and terminating in the capillary tube and an electric connection of opposite sign to said steel tube.

12. A thermal switch comprising the combination of a reservoir filled with mercury, a capillary tube having a tapered enlargement at its upper end connected to said reservoir, a glass dome mounted over said capillary tube and filled with inert gas, a current conductor sealed through said dome and terminating in the capillary tube, an annular wall for retaining a mercury seal around the lower edge of said dome and an adjusting screw passing through the mercury seal into the reservoir for changing its capacity.

In witness whereof I have hereunto set my hand this fifth day of November, 1915.

GEORGE WILKINSON.

Witnesses:
 ROBERT McCOURT,
 CLIFFORD ASTICK.